US010569781B2

(12) United States Patent
Noto et al.

(10) Patent No.: US 10,569,781 B2
(45) Date of Patent: Feb. 25, 2020

(54) TRAVELING ASSISTANCE APPARATUS

(71) Applicant: DENSO CORPORATION, Kariya, Aichi-pref. (JP)

(72) Inventors: Noriyasu Noto, Kariya (JP); Masanobu Yamaguchi, Kariya (JP); Tetsuya Tokuda, Kariya (JP); Yasuhiko Mukai, Kariya (JP); Yosuke Hattori, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 191 days.

(21) Appl. No.: 15/624,410

(22) Filed: Jun. 15, 2017

(65) Prior Publication Data
US 2017/0361848 A1 Dec. 21, 2017

(30) Foreign Application Priority Data

Jun. 17, 2016 (JP) ................. 2016-120811

(51) Int. Cl.
*B60W 30/18* (2012.01)
*B60W 10/18* (2012.01)
*B60W 10/20* (2006.01)

(52) U.S. Cl.
CPC ...... *B60W 30/18145* (2013.01); *B60W 10/18* (2013.01); *B60W 10/20* (2013.01);
(Continued)

(58) Field of Classification Search
CPC .......... B60W 30/18145; B60W 10/18; B60W 10/20; B60W 30/045; B60W 30/10;
(Continued)

(56) References Cited

U.S. PATENT DOCUMENTS

2004/0153228 A1* 8/2004 Matsumoto ......... B60T 8/17552
701/41
2004/0230375 A1* 11/2004 Matsumoto ......... B60T 8/17557
701/301
(Continued)

FOREIGN PATENT DOCUMENTS

JP H06-171392 A 6/1994
JP 2008-094111 4/2008
(Continued)

*Primary Examiner* — Tuan C To
(74) *Attorney, Agent, or Firm* — Knobbe, Martens, Olson & Bear, LLP

(57) ABSTRACT

A traveling assistance apparatus recognizes a travel road on which a vehicle is traveling, acquires a traveling state of the vehicle, and determines whether or not the vehicle will deviate from the travel road based on the recognition result of the travel road and the traveling state of the vehicle. The apparatus determines whether to perform, as a prevention method for preventing from the travel road, a method in which either of steering control and brake control of the vehicle is performed, or a method in which a period over which either of the steering control and the brake control is performed and a period over which both of the steering control and the brake control are performed are set. The apparatus sets a steering amount for the steering control and a brake amount for the brake control when the deviation prevention control is performed based on the prevention method.

19 Claims, 13 Drawing Sheets

(52) U.S. Cl.
CPC ..... *B60W 2420/42* (2013.01); *B60W 2420/52* (2013.01); *B60W 2510/18* (2013.01); *B60W 2510/20* (2013.01); *B60W 2520/105* (2013.01); *B60W 2520/125* (2013.01); *B60W 2520/14* (2013.01); *B60W 2540/26* (2013.01); *B60W 2550/12* (2013.01); *B60W 2550/148* (2013.01); *B60W 2710/18* (2013.01); *B60W 2710/20* (2013.01); *B60W 2720/106* (2013.01); *B60W 2720/125* (2013.01); *B60W 2720/14* (2013.01)

(58) Field of Classification Search
CPC ......... B60W 50/0097; B60W 2420/42; B60W 2420/52; B60W 2510/18; B60W 2510/20; B60W 2520/105; B60W 2520/125; B60W 2520/14; B60W 2540/26; B60W 2550/12; B60W 2550/14; B60W 2550/148; B60W 2710/18; B60W 2710/20; B60W 2720/106; B60W 2720/125; B60W 2720/14
USPC .......................................................... 701/41
See application file for complete search history.

(56) References Cited

U.S. PATENT DOCUMENTS

| | | |
|---|---|---|
| 2005/0113999 A1 | 5/2005 | Tange et al. |
| 2006/0142921 A1 | 6/2006 | Takeda |
| 2013/0226409 A1 | 8/2013 | Akiyama et al. |
| 2015/0307094 A1 | 10/2015 | Ito et al. |
| 2016/0090100 A1* | 3/2016 | Oyama ............. B60W 50/0225 701/23 |
| 2016/0114811 A1* | 4/2016 | Matsuno ........... B60W 50/0225 701/23 |
| 2016/0121906 A1* | 5/2016 | Matsuno ................ B60K 28/10 701/23 |
| 2016/0132055 A1* | 5/2016 | Matsuno ............... B60W 50/10 701/23 |
| 2016/0259338 A1* | 9/2016 | Nakamura ............ B60W 30/12 |
| 2016/0313133 A1* | 10/2016 | Zeng ............... B60W 30/18163 |
| 2016/0320776 A1* | 11/2016 | Inami ...................... F02D 41/00 |
| 2017/0021731 A1* | 1/2017 | Suzuki ...................... B60L 7/26 |
| 2017/0192434 A1* | 7/2017 | Kou ..................... B60W 30/14 |
| 2017/0291603 A1* | 10/2017 | Nakamura ............ B60W 30/09 |

FOREIGN PATENT DOCUMENTS

| | | | |
|---|---|---|---|
| JP | 2008-094111 A | | 4/2008 |
| JP | 2008273360 A | * | 11/2008 |
| JP | 2011057038 A | * | 3/2011 .......... B60T 8/17557 |

* cited by examiner

TRAVELING ASSISTANCE APPARATUS

CROSS-REFERENCE TO RELATED APPLICATION

This application is based on and claims the benefit of priority from Japanese Patent Application No. 2016-120811, filed Jun. 17, 2016. The entire disclosure of the above application is incorporated herein by reference.

BACKGROUND

Technical Field

The present disclosure relates to a technology for preventing deviation of a vehicle from a travel road.

Related Art

A technology is known in which, when a vehicle is predicted to deviate from a travel road on which the vehicle is traveling, the vehicle is prevented from deviating from the travel road by at least either of steering control and brake control being performed.

For example, in a technology described in JP-A-2008-094111, when deviation prevention control to prevent deviation from a travel road is performed, a division ratio of the steering control and the brake control is set. The steering control and the brake control are then performed based on the division ratio.

In the technology described in JP-A-2008-094111, during the deviation prevention control, the steering control and the brake control are simultaneously performed based on the division ratio. When the steering control and the brake control are simultaneously performed, lateral acceleration generated by the steering control and deceleration, which is acceleration working in a decelerating direction, generated by the brake control are applied to the vehicle as combined acceleration.

When the steering control and the brake control are simultaneously performed in this manner, in some cases, the lateral acceleration of a magnitude required to prevent deviation may not be generated because of the deceleration generated by the brake control. Consequently, appropriate deviation prevention control may not be performed.

SUMMARY

It is thus desired to provide a technology for performing appropriate deviation prevention control to prevent deviation from a travel road.

An exemplary embodiment of the present disclosure provides a travelling assistance apparatus that includes a travel road recognizing unit, a traveling state acquiring unit, a deviation determining unit, a method determining unit, and a traveling control unit.

The travel road recognizing unit recognizing a travel road on which a vehicle is traveling. The traveling state acquiring unit acquires a traveling state of the vehicle. The deviation determining unit determines whether or not the vehicle will deviate from the travel road based on a recognition result of the travel road recognized by the travel road recognizing unit and the traveling state acquired by the traveling state acquiring unit.

The method determining unit determines whether to perform, as a prevention method for deviation prevention control to prevent deviation of the vehicle from the travel road when the deviation determining unit determines that the vehicle will deviate from the travel road, a method in which either of steering control and brake control of the vehicle is performed, or a method in which a period over which either of the steering control and the brake control is performed and a period over which both of the steering control and the brake control are performed are set, based on the recognition result and the traveling state.

The traveling control unit sets a steering amount for the steering control and a brake amount for the brake control when the deviation prevention control is performed based on the prevention method determined by the method determining unit, based on the recognition result and the traveling state.

As a result of this configuration, whether to perform the method in which either of steering control and brake control is performed, or the method in which a period over which either of the steering control and the brake control is performed and a period over which both of the steering control and the brake control are performed are set, as the prevention method for the deviation prevention control can be appropriately determined based on the recognition result of the travel road on which the vehicle is traveling and the traveling state of the vehicle.

Therefore, in cases in which a large lateral acceleration is required to prevent deviation, the prevention method can be appropriately determined to be a prevention method in which the steering control is first performed, and then, midway through the steering control, the brake control (braking process) is performed in addition to the brake control, based on the recognition result of the travel road and the traveling state of the vehicle. Consequently, appropriate deviation prevention control can be performed based on the recognition result of the travel road and the traveling state of the vehicle.

DESCRIPTION OF THE EMBODIMENTS

Embodiments of the present disclosure will hereinafter be described with reference to the drawings.

1. First Embodiment

[1-1. Configuration]

Figure 1:
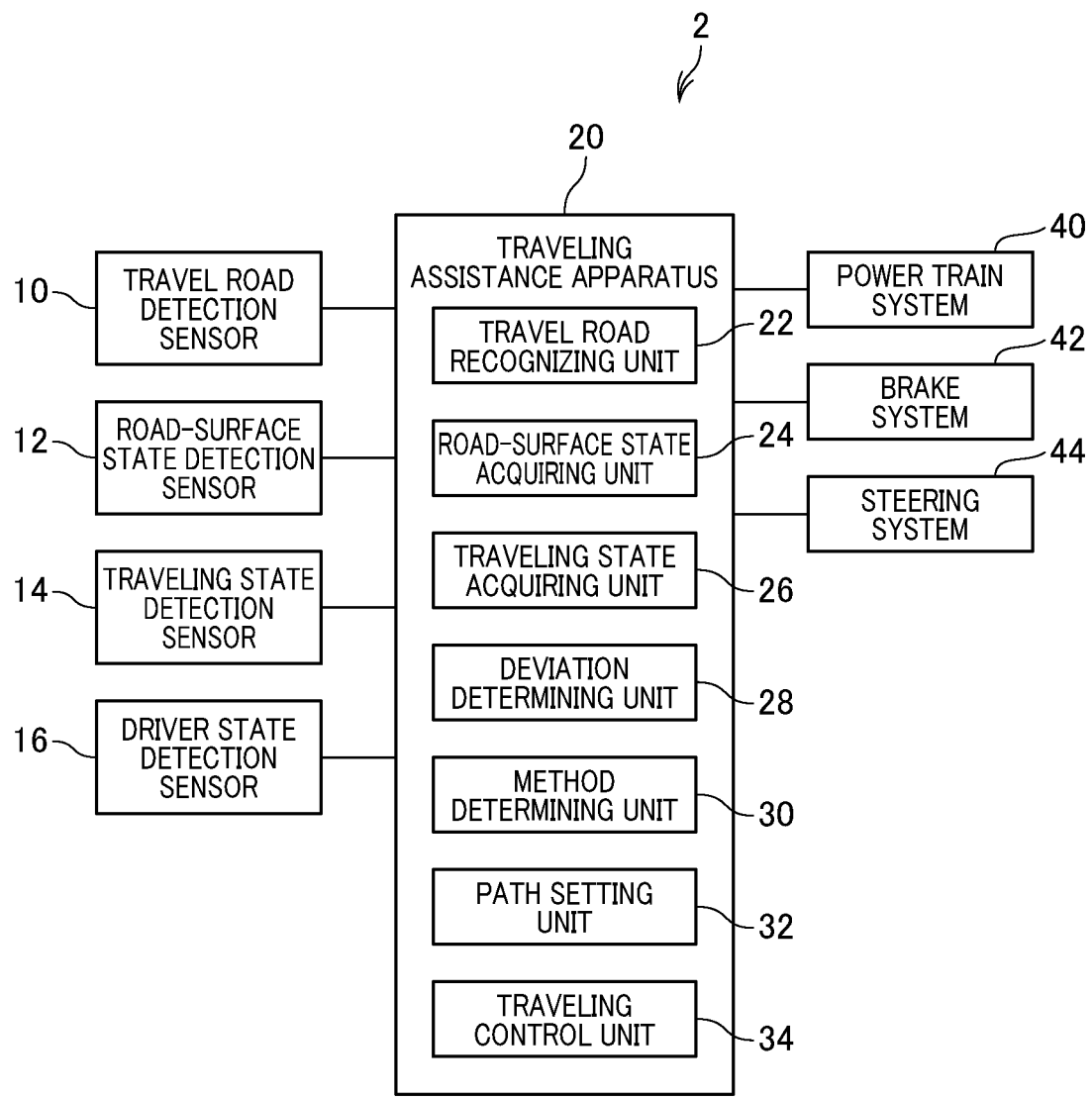
FIG. 1 is a block diagram of a traveling assistance apparatus according to a first embodiment.

A traveling assistance system 2 according to a first embodiment is mounted in a vehicle. As shown in FIG. 1, the traveling assistance system 2 includes a travel road detection sensor 10, a road-surface state detection sensor 12, a traveling state detection sensor 14, a driver state detection sensor 16, a traveling assistance apparatus 20, a power train system 40, a brake system 42, and a steering system 44.

The travel road detection sensor 10 detects a travel road on which the vehicle is traveling. For example, a camera or a light detection and ranging (LIDAR) apparatus is used as the travel road detection sensor 10.

A camera is attached to each of a front side and a rear side of the vehicle. The cameras output image data of an image of the periphery of the vehicle to the traveling assistance apparatus 20. From the image data picked up by the camera, for example, coordinates of each point on a white line that demarcates the travel road can be calculated. From the coordinates of each point, a curvature of the travel road can be acquired as the shape of the travel road.

For example, the LIDAR apparatus is attached to each of the front side and the rear side of the vehicle. The LIDAR apparatus outputs the strength of a reflected wave of transmitted laser light to the traveling assistance apparatus 20. From the strength of the reflected wave of the laser light, an asphalt portion and a white line portion on a road surface of the travel road can be detected. The coordinates of each point on the white line can then be calculated, and from the coordinates of each point, the curvature of the travel road can be acquired as the shape of the travel road.

In addition, the LIDAR apparatus calculates a distance to an object, such as another vehicle or a pedestrian, in the periphery of the vehicle, based on an amount of time required for a reflected wave reflected by the object to be received. Furthermore, an azimuth (orientation), that is, an angle of the object in relation to the vehicle is determined based on a reception direction of the reflected wave. The LIDAR outputs the distance to the detected object and the azimuth of the detected object to the traveling assistance apparatus 20.

A radar that emits radio waves, such as a millimeter-wave radar, may be used instead of the LIDAR apparatus that emits laser light. When the millimeter-wave radar is used, detection of the white line is preferably performed through use of the image data picked up by the camera, in addition to data from the millimeter-wave radar, to prevent erroneous detection between the white line and an object, such as a curb, near the white line.

The road-surface state detection sensor 12 detects a friction coefficient as a road-surface state of the travel road. For example, a strain sensor or a camera attached to a tire is used as the road-surface state detection sensor 12.

The strain sensor detects strain generated in the tire as a result of friction with the road surface of the travel road. The traveling assistance apparatus 20 can estimate that the friction coefficient becomes greater as the strain increases, based on the strain in the tire acquired from the strain sensor. In addition, the traveling assistance apparatus 20 can detect rainfall and snowfall based on the image data picked up by the camera, and estimate the friction coefficient of the road surface of the travel road.

The traveling state detection sensor 14 detects a vehicle speed, acceleration in the forward, backward, leftward, and rightward directions, a yaw rate, a current position of the vehicle, and the like as the traveling state of the vehicle. The traveling state detection sensor 14 then outputs the detected traveling state to the traveling assistance apparatus 20. A vehicle speed sensor, an acceleration sensor, a yaw rate sensor, and the like are used as the traveling state detection sensor 14.

The driver state detection sensor 16 detects the driving state of a driver. The driver state detection sensor 16 then outputs the detected driving state to the traveling assistance apparatus 20. A camera that captures an image of the expression of the driver, a grip sensor that is set in a steering wheel, and the like are used as the driver state detection sensor 16.

The traveling assistance apparatus 20 analyzes the expression of the driver from the image data picked up by the camera that has captured an image of the expression of the driver. The traveling assistance apparatus 20 then determines whether or not the driver is alert, that is, the driver is in a state capable of driving.

For example, the grip sensor is a pressure sensor set inside the steering wheel. The traveling assistance apparatus 20 can determine whether or not the driver is gripping the steering wheel, that is, the driver is in a state capable of driving based on the pressure detected by the grip sensor.

A microcomputer is mounted in the traveling assistance apparatus 20. The microcomputer includes a central processing unit (CPU), a random access memory (RAM), a read-only memory (ROM), and a semiconductor memory, such as a flash memory. The traveling assistance apparatus 20 may be composed of a single microcomputer or a plurality of microcomputers.

Each function of the traveling assistance apparatus 20 is actualized by the CPU running programs stored in the ROM or a non-transitory, tangible recording medium (non-transitory computer-readable storage medium), such as a flash memory. A method corresponding to a program is performed as a result of the CPU running the program.

The traveling assistance apparatus 20 includes a travel road recognizing unit 22, a road-surface state acquiring unit 24, a traveling state acquiring unit 26, a deviation determining unit 28, a method determining unit 30, a path setting unit 32, and a traveling control unit 34 as configurations of the functions actualized as a result of the CPU running the programs. The foregoing units that actualize the functions of the traveling assistance apparatus 20 will be described hereafter.

The means for actualizing the elements configuring the traveling assistance apparatus 20 is not limited to software. Some or all of the elements may be actualized through use of hardware combining logic circuits, analog circuits, and the like.

When an internal combustion engine is mounted to the vehicle as a drive source, the power train system 40 controls an aperture of a throttle apparatus and a fuel injection amount, based on a drive output specified by the traveling assistance apparatus 20. When a motor is mounted to the vehicle as a drive source, the power train system 40 controls power supply to the motor, based on the drive output specified by the traveling assistance apparatus 20.

The brake system 42 controls an actuator provided in a hydraulic circuit of a hydraulic brake, based on a brake amount specified by the traveling assistance apparatus 20. When the motor is mounted in the vehicle as the drive source, the brake system 42 may generate braking force from a regenerative brake by controlling power supply to the motor, based on the brake amount specified by the travel control unit 34.

The steering system 44 drives the steering wheel and steers the vehicle based on a steering amount specified by the traveling assistance apparatus 20.

[1-2. Processes]

Figure 2:
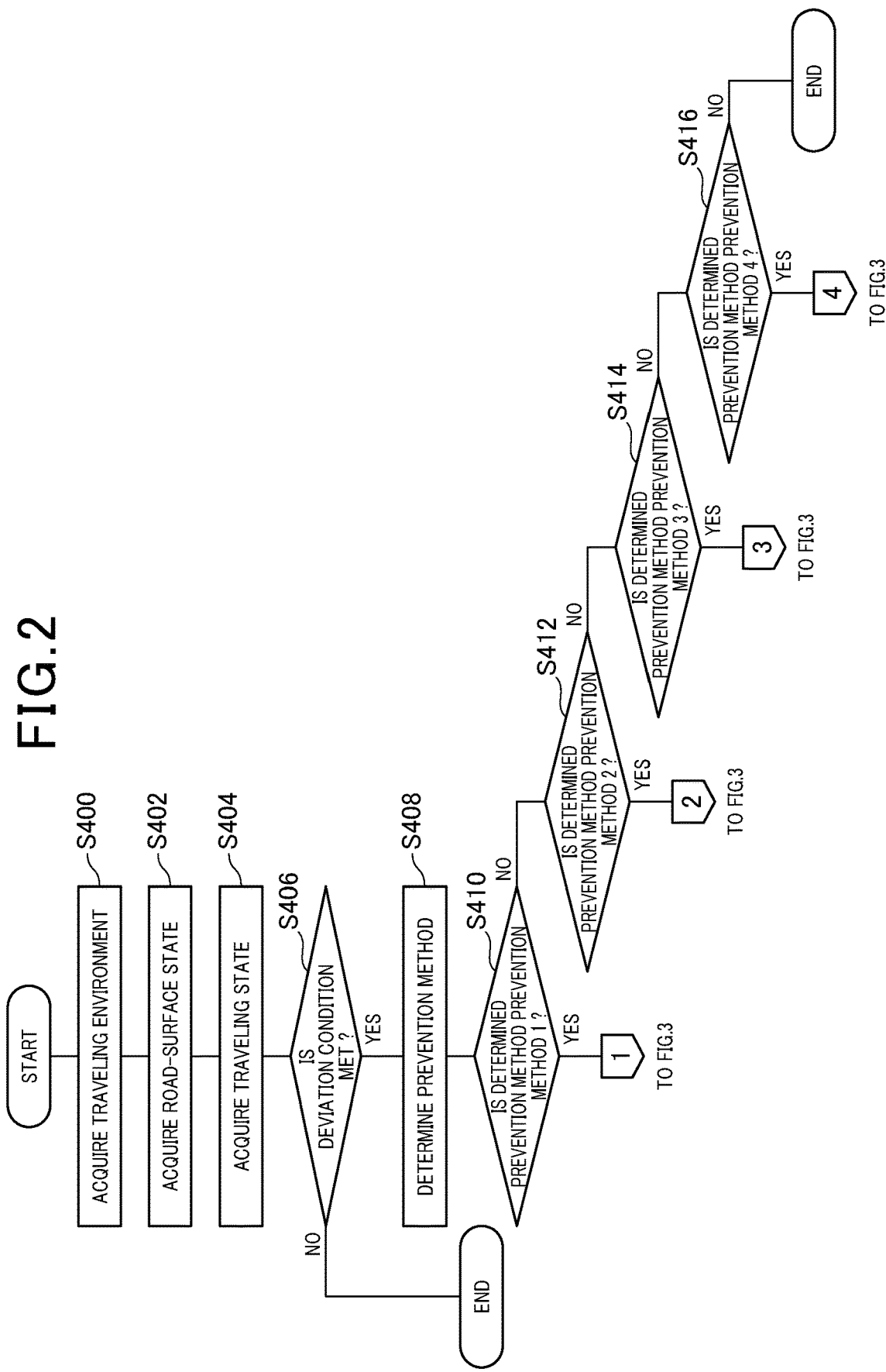
FIG. 2 is a flowchart of a deviation prevention process.

A deviation prevention process performed by the traveling assistance apparatus 20 will be described with reference to the flowchart in FIG. 2. The process in the flowchart in FIG. 2 is performed during normal operation at a predetermined time interval.

At S400, the travel road recognizing unit 22 acquires coordinates of a boundary of a travel road on which the vehicle is traveling, the vehicle being a point of origin of the coordinate axes. The travel road recognizing unit 22 acquires the coordinates from the travel road detection sensor 10 as the detection result of the travel road. The boundary of the travel road may be a white line that demarcates the travel road. The boundary may also be a boundary between a paved road and an unpaved shoulder of the road.

For example, the travel road recognizing unit 22 determines a function for approximating the white line from the coordinates of the white line, and calculates a curvature from the function for approximating the white line as the shape of the travel road. In addition, the travel road recognizing unit 22 recognizes the position of the white line in relation to the vehicle, based on the function for approximating the white line. The travel road recognizing unit 22 outputs the curvature of the travel road and the position of the white line in relation to the vehicle as the recognition result of the travel road. For example, a cubic function is used as the function for approximating the white line.

At S402, the road-surface state acquiring unit 24 acquires the friction coefficient as the road-surface state of the travel road, based on the output from the strain sensor set in the tire or an analysis result of the image data from the camera that has captured the image of the periphery of the vehicle.

At S404, the traveling state acquiring unit 26 acquires the vehicle speed, the acceleration in the forward, backward, leftward, and rightward directions, the yaw rate, and the like from the traveling state detection sensor 14, as the traveling state of the vehicle.

At S406, the deviation determining unit 28 determines whether or not the vehicle will deviate from the travel road, based on the recognition result of the travel road from the travel road recognizing unit 22 and the traveling state of the vehicle acquired by the traveling state acquiring unit 26.

Either of the following conditions (1) and (2) is set for the determination regarding whether or not the vehicle will deviate from the travel road. The deviation determining unit 28 then determines whether or not the vehicle will deviate from the travel road based on whether or not the condition is met.

Figure 5:
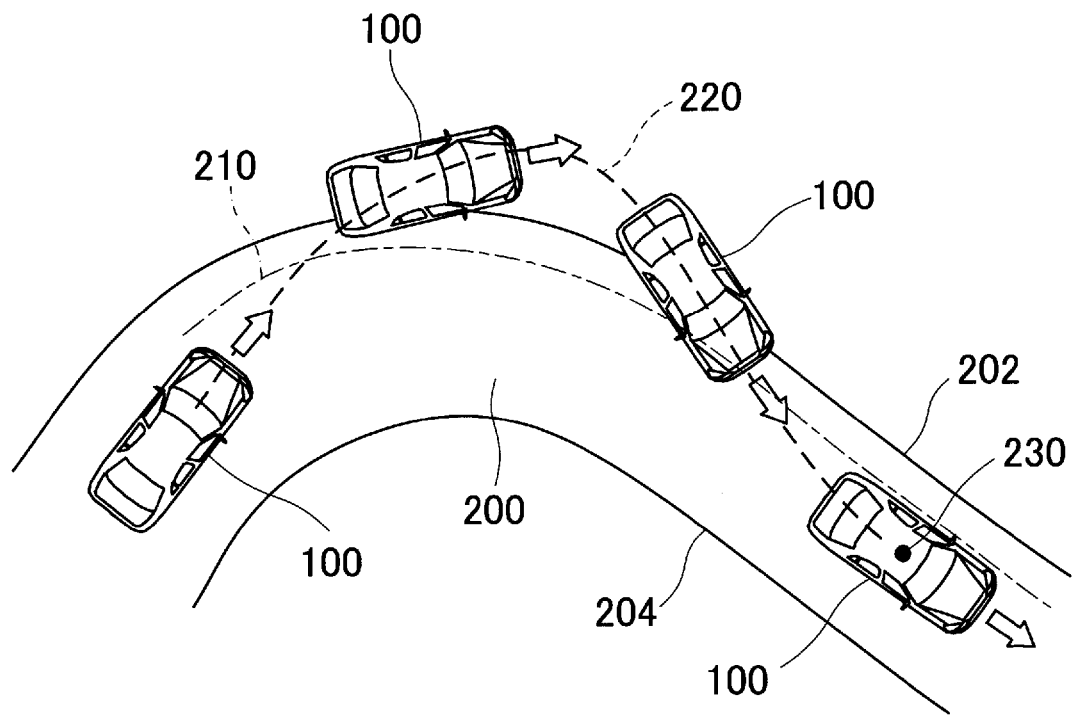
FIG. 5 is an explanatory diagram of traveling of a vehicle during deviation prevention.

(1) In FIG. 5, a part of a vehicle 100 crosses a white line 202 or 204 that demarcate a travel road (travel lane) 200.

(2) In FIG. 5, a part of the vehicle 100 crosses a prevention start line 210.

For example, the condition (1) is determined based on a positional relationship between the white lines 202 and 204 and the vehicle 100 acquired from the image data picked up by the camera. In addition, for example, the condition (2) is determined based on a positional relationship between the prevention start line 210 set in the image data picked up by the camera and the vehicle 100.

The prevention start line 210 is set such that a distance d increases as a deviation speed increases and a curvature of the travel road 200 increases. The distance d is a distance away from the white line 202 or 204 in the inward direction, the white line 202 or 204 being the white line on the side on which the deviation by the vehicle occurs. The deviation speed is a speed at which the vehicle deviates from the road. The curvature of the travel road 200 is indicated by the curvatures of the white lines 202 and 204. The deviation speed may be the vehicle speed or a differential of the distance between the vehicle and the white line.

Here, a traveling direction may be acquired as the traveling state of the vehicle 100 from the yaw rate sensor that is one of the traveling state detection sensors 14. Whether or not the vehicle 100 will deviate from the travel road 200 may be determined based on the traveling direction of the vehicle 100 and the positions of the white lines 202 and 204.

When the determination at S406 is No and the vehicle 100 will not deviate from the travel road 200, the present process is ended.

Figure 4:
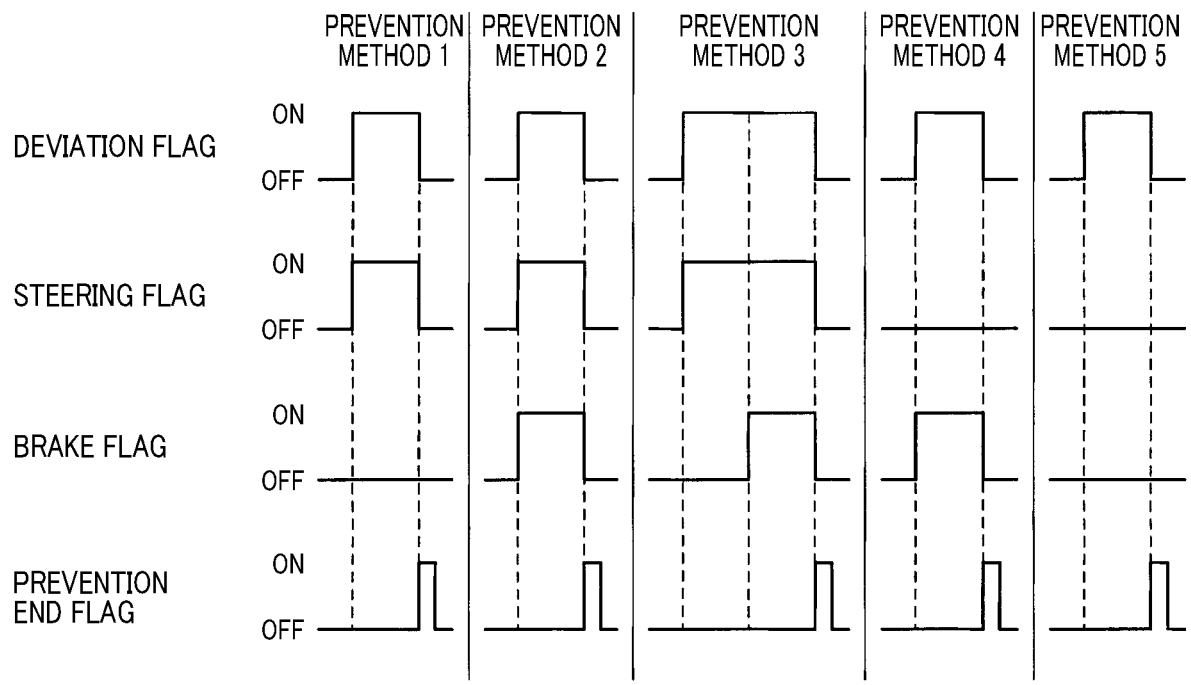
FIG. 4 is a time chart of the deviation prevention process for each prevention method.

When the determination at S406 is Yes and the vehicle 100 will deviate from the travel road 200, at S408, the method determining unit 30 sets a deviation flag to ON, as shown in FIG. 4, and determines a prevention method for preventing deviation of the vehicle from the travel road.

Figure 6:
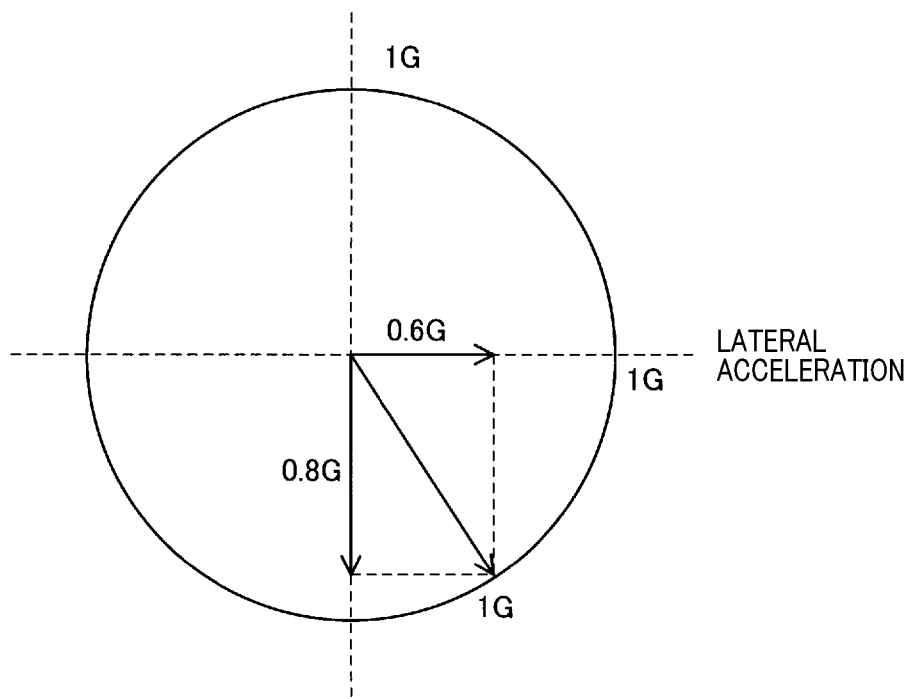
FIG. 6 is an explanatory diagram of combined acceleration combining lateral acceleration and forward-backward (longitudinal) acceleration.

Here, when steering control and brake control are performed to prevent deviation, lateral acceleration due to the steering control and deceleration due to the brake control are applied to the vehicle. In FIG. 6, an upward direction of the forward-backward (longitudinal) acceleration indicates acceleration in the forward direction. A downward direction of the forward-backward acceleration indicates deceleration in the backward direction. In addition, a rightward direction of the lateral acceleration indicates acceleration in the rightward direction. A leftward direction of the lateral acceleration indicates acceleration in the leftward direction. A combined acceleration that is a combination of the acceleration in the forward-backward direction and the acceleration in the lateral direction is applied to the vehicle.

A limit acceleration at a gravitational center of the vehicle is presumed to be 1 G in FIG. 6. The limit acceleration is the limit of the acceleration by which the vehicle is able to travel in a manner that prevents deviation when the combined acceleration is applied to the vehicle. G expresses gravitational acceleration. For example, when the lateral acceleration in the rightward direction generated by the steering control is 0.6 G and the deceleration in the backward direction generated by the brake control is 0.8 G, the combined acceleration is 1 G, which is the limit acceleration.

The limit acceleration increases as the friction coefficient of the road surface of the travel road increases. The limit acceleration decreases as the friction coefficient decreases. The friction coefficient of the road surface of the travel road is smaller when the road surface is wet with rain or the like, compared to when the road surface is dry. Furthermore, the friction coefficient of the road surface is smaller when the road surface is covered with snow, compared to when the road surface is wet.

Figure 7:
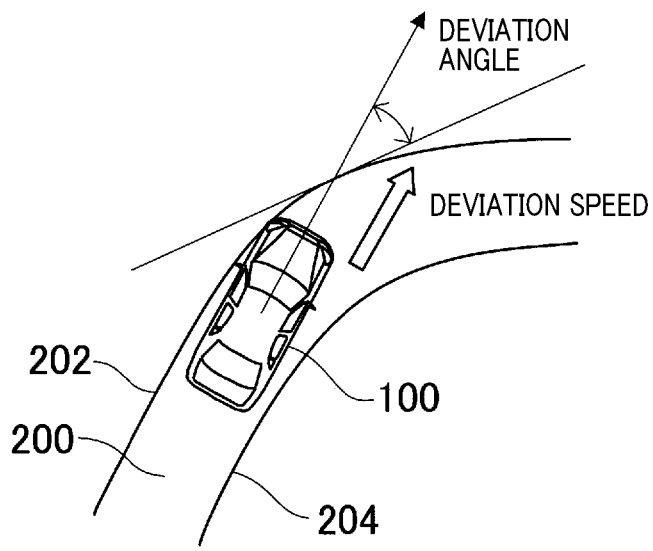
FIG. 7 is an explanatory diagram of deviation by a vehicle.

In addition, as shown in FIG. 7, when the vehicle 100 deviates from the travel road 200, the lateral acceleration required to prevent deviation increases as a deviation angle at which the vehicle 100 deviates from the travel road 200 increases and the deviation speed at which the vehicle 100 deviates from the travel road 200 increases. The deviation angle is an angle formed by a tangent of the white line 202 on the deviation side and a straight line along the traveling direction of the vehicle 100.

The combined acceleration combining the forward-backward acceleration and the lateral acceleration cannot exceed the limit acceleration. Therefore, when the limit acceleration is 1 G, even should lateral acceleration of 0.7 G be required to prevent deviation, if 0.8 G is generated by the brake control as the maximum deceleration, only lateral acceleration of 0.6 G can be generated. In this case, appropriate deviation prevention control cannot be performed.

Figure 8:
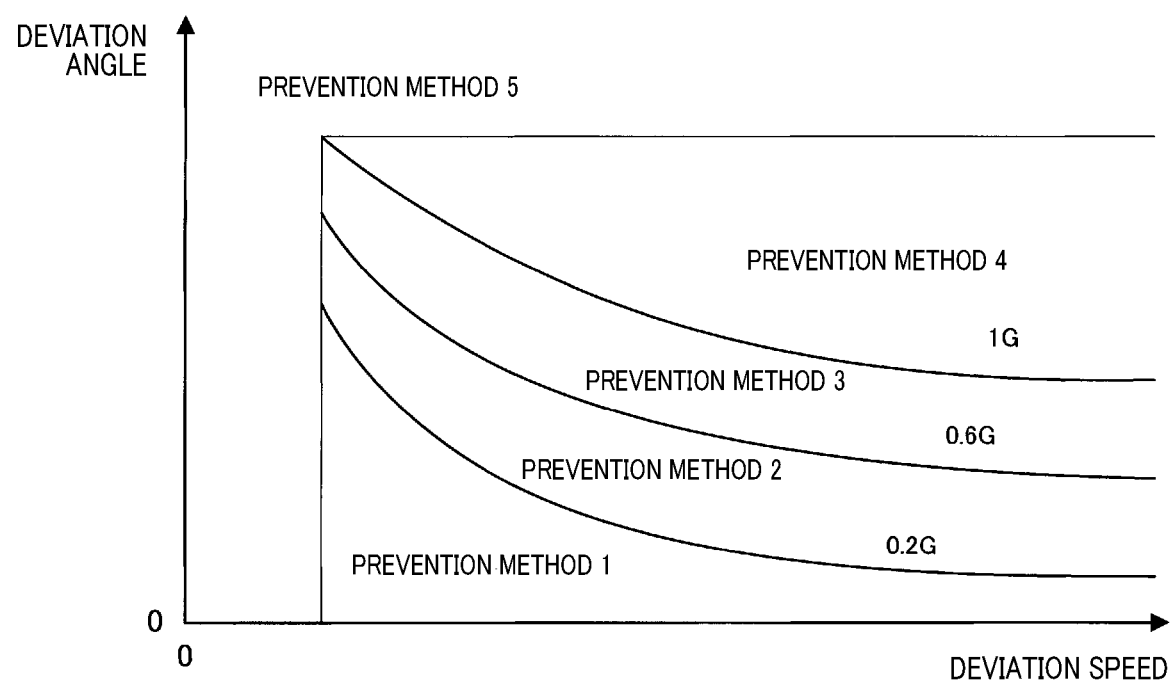
FIG. 8 is a characteristics diagram of a relationship between deviation speed, deviation angle, lateral acceleration, and prevention method.

Therefore, as shown in FIG. 8, according to the present embodiment, the prevention method for preventing deviation is determined based on a map that indicates a relationship between the deviation speed, the deviation angle, the lateral acceleration required for deviation prevention, and the prevention method. Here, 0.2 G, 0.6 G, and 1 G shown in FIG. 8 indicate examples of the lateral acceleration required for deviation prevention when the road surface is in a dry state.

Among the prevention methods 1 to 5 below, the prevention methods 1 to 4 are selected when the deviation angle is equal to or less than a predetermined angle and the deviation speed is equal to or higher than a predetermined speed.

(1) Prevention Method 1

When the lateral acceleration required for deviation prevention is equal to or less than 0.2 G, the force applied to a passenger of the vehicle as a result of the lateral acceleration is within a range in which the passenger does not feel alarm. Therefore, the deviation prevention control is performed by only the steering control, and the brake control is not performed.

(2) Prevention Method 2

When the lateral acceleration required for deviation prevention is equal to or less than 0.6 G, even should the maximum deceleration of 0.8 G be generated by the brake control, the lateral acceleration required for deviation prevention can be generated. Here, when the lateral acceleration required for deviation prevention is greater than 0.2 G and equal to or less than 0.6 G, the steering control and the brake control are simultaneously performed as the deviation prevention control.

(3) Prevention Method 3

When the maximum deceleration of 0.8 G is generated by the brake control, lateral acceleration that is greater than 0.6 G is not generated. Here, when the lateral acceleration required for deviation prevention is greater than 0.6 G and equal to or less than 1 G, first, only the steering control is performed, and the brake control is not performed. As a result, when the deviation prevention control is started, the lateral acceleration that is greater than 0.6 G and equal to or less than 1 G can be generated.

Then, for example, when the steering control is continued and the lateral acceleration required for deviation prevention becomes equal to or less than 0.6 G, the brake control is performed in addition to the steering control during the deviation prevention control.

(4) Prevention Method 4

Even when the lateral acceleration required for deviation prevention is equal to or greater than 1 G, lateral acceleration that is greater than 1 G, which is the limit acceleration, cannot be generated. In this case, only the brake control is performed and the steering control is not performed. The vehicle is stopped as quickly as possible by the brake control.

(5) Prevention Method 5

When the deviation angle exceeds the predetermined angle or the deviation speed is lower than the predetermined speed, the steering control and the brake control for preventing deviation are not performed.

Here, the lateral acceleration that serves to prescribe the border between methods for the above-described prevention methods 1 to 5 decreases as the friction coefficient acquired at S402 decreases.

Figure 3:
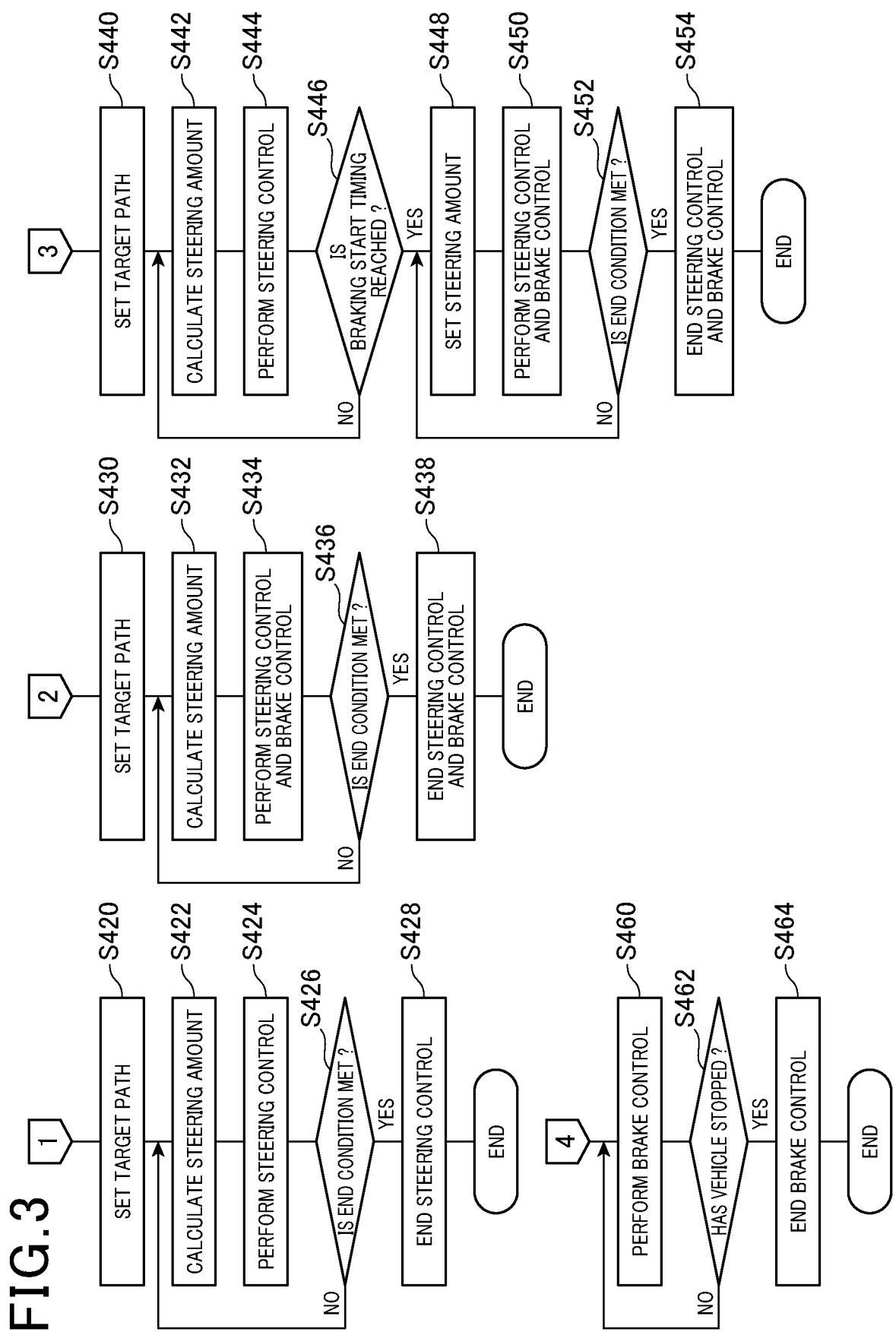
FIG. 3 is a flowchart of the deviation prevention process.

When the determination at S410 is Yes and the prevention method determined at S408 is the prevention method 1, at S420 in FIG. 3, the path setting unit 32 sets a target path for deviation prevention by the vehicle.

As shown in FIG. 5, a target path 220 is obtained by a current position of the vehicle 100 and a target point 230 for traveling by the vehicle 100 to prevent deviation being smoothly connected through use of spline curves and quintic curves. The target point 230 is set on the travel road 200. For example, the target point 230 is set at the center of the travel road 200, separated from the current position of the vehicle 100 by a predetermined distance along the travel road 200.

In the deviation prevention control, when a steering torque is set as the steering amount, rather than a steering angle being set as the steering amount based on the difference between the target path and the position of the vehicle, the process for setting the target path at S420, and at S430 and S440, described hereafter, is omitted.

At S422, the traveling control unit 34 sets a steering flag to ON, as shown in FIG. 4, and calculates the steering amount for deviation prevention by the vehicle. At S422, and at S432 and S442, described hereafter, the traveling control unit 34 calculates and sets the steering amount in the following manner.

(1) Steering Control Based on the Target Path

The traveling control unit 34 calculates the steering angle as the steering amount by proportional-integral-derivative (PID) control, optimal regulator control, or the like so that the distance between the target path and a predicted position, several meters ahead, of the vehicle in relation to the target path becomes zero. The predicted position, several meters ahead, of the vehicle in relation to the target path is predicted based on the current position of the vehicle in relation to the target path, the current vehicle speed of the vehicle, and the traveling direction of the vehicle. When the deviation prevention control ends and the deviation flag is set to OFF, the integral term is reset to zero.

(2) Steering Torque Control

As expressed in an expression (1), below, the traveling control unit 34 calculates a steering torque T as the steering amount by multiplying a distance $\Delta L$ and a gain Kv. The distance $\Delta L$ is the distance between the white line and a predicted position, several meters ahead, of the vehicle in relation to the white line. The gain Kv is set in advance based on the vehicle speed. The predicted position, several meters ahead, of the vehicle in relation to the white line is predicted based on the current position of the vehicle in relation to the white line, the current vehicle speed of the vehicle, and the traveling direction of the vehicle $$T = Kv \times \Delta L \quad (1)$$

At S424, the traveling control unit 34 controls the steering of the vehicle by the steering amount calculated by the traveling control unit 34 at S422. At S426, the traveling control unit 34 determines whether or not an end condition for the deviation prevention control is met. The traveling control unit 34 performs the determination based on whether or not any of the following conditions (1) to (4) is met.

(1) A predetermined amount of time has elapsed from the start of the deviation prevention control.

(2) The vehicle has returned inside the travel road.

(3) The lateral acceleration and the yaw rate of the vehicle are respectively equal to or lower than predetermined values, and traveling of the vehicle has stabilized.

(4) The vehicle speed has decreased to a predetermined speed or lower. The predetermined speed at this time is set to a lower speed as the radius of the travel road becomes smaller.

When the determination at S426 is No and the end condition for the deviation prevention control is not met, the process returns to S422 and the deviation prevention control is continued. When the determination at S426 Yes and the end condition for the deviation prevention control is met, at S428, the traveling control unit 34 sets the steering flag to OFF and ends the steering control. Furthermore, the traveling control unit 34 sets a prevention end flag to ON, sets the deviation flag to OFF, and ends the deviation prevention control.

When the determination at S412 is Yes and the prevention method determined at S408 is the prevention method 2, at S430 in FIG. 3, the path setting unit 32 sets the target path for preventing deviation, when the steering amount is not set by the steering torque.

At S432, the traveling control unit 34 sets the steering flag and a brake flag to ON, as shown in FIG. 4, and sets the steering amount by the method described regarding S422.

At S434, the traveling control unit 34 performs both the steering control and the brake control as the deviation prevention control. The traveling control unit 34 performs the steering control based on the steering amount set at S432. The brake amount for performing the brake control is set so that the deceleration set in advance for the prevention method 2 is achieved.

At S450 and S460, described hereafter, as well, the traveling control unit 34 sets the brake amount so that the decelerations respectively set in advance for the prevention methods 3 and 4 is achieved, and performs the brake control. Here, the decelerations respectively set for the prevention methods 2, 3, and 4 decrease as the friction coefficient acquired at S402 decreases.

In addition, when the travel road is uphill, the decelerations respectively set for the prevention methods 2, 3, and 4 may be increased. When the travel road is downhill, the decelerations respectively set for the prevention methods 2, 3, and 4 may be decreased. For example, the travel road recognizing unit 22 acquires the current position of the vehicle from a navigation satellite apparatus, and acquires and recognizes the gradient of the travel road from the current position of the vehicle and map data in a map database (DB).

At S436, the traveling control unit 34 determines whether or not the end condition for the deviation prevention control is met. The traveling control unit 34 performs the determination based on whether or not any of the conditions (1) to (4), described as the end conditions for the deviation prevention control in the determination at S426, and in addition, a condition (5), below, are met.

(5) The vehicle has stopped when the driver is in a state incapable of driving. The driver being in a state incapable of driving is, for example, when the driver is not gripping the steering wheel based on the output from the grip sensor, or when the driver is not alert, such as when the driver is sleeping or unconscious, based on image data picked up by an interior camera. The vehicle is stopped by the brake control performed at S434 even when the driver is in a state incapable of driving.

When the determination at S436 is No, the process returns to S432 and the deviation prevention control is continued. When the determination at S436 is Yes and the end condition for the deviation prevention control is met, at S438, the traveling control unit 34 sets the steering flag and the brake flag to OFF, and ends the steering control and the brake control. Furthermore, the traveling control unit 34 sets the prevention end flag to ON, sets the deviation flag to OFF, and ends the deviation prevention control.

When the determination at S414 is Yes and the prevention method determined at S408 is the prevention method 3, at S440 in FIG. 3, the path setting unit 32 sets the target path for preventing deviation when the steering amount is not set by the steering torque. At S442, the traveling control unit 34 sets the steering flag to ON, as shown in FIG. 4, and sets the steering amount. The steering amount is set by the method described regarding S422.

At S444, the traveling control unit 34 controls the steering of the vehicle based on the steering amount set at S442. At S446, the traveling control unit 34 determines whether or not a timing for starting the brake control in addition to the steering control is reached.

The traveling control unit 34 performs the determination at S446 based on whether or not any of the following conditions (1) to (4) is met. All of the conditions (1) to (3) indicate that the lateral acceleration required for the deviation prevention control has decreased from that at the start of the deviation prevention control.

(1) A predetermined amount of time has elapsed from the start of the deviation prevention control.

(2) The traveling direction of the vehicle has become a direction returning to the travel road.

(3) The lateral acceleration required for the deviation prevention control has decreased, and the combined acceleration is equal to or less than the limit acceleration even when the brake control is performed.

When the determination at S446 is No and the start timing for the brake control is not yet reached, the process returns to S442 and the deviation prevention control by the steering control is continued.

When the determination at S446 is Yes and the start timing for the brake control is reached, at S448, the traveling control unit 34 sets the brake flag to ON. Furthermore, at S448, the traveling control unit 34 sets the steering amount by the method described regarding S422.

At S450, the traveling control unit 34 performs the steering control based on the steering amount set at S448. In addition, at S450, the traveling control unit 34 sets the brake amount so that the deceleration set in correspondence to the prevention method 3 is achieved, and performs the brake control.

At S452, the traveling control unit 34 determines whether or not any of the conditions (1) to (5), described regarding S436 as the end conditions for the deviation prevention control, is met. Here, regarding the determination at S452, S434 shall be read as S450 in the description regarding the condition (5) for S436.

When the determination at S452 is Yes and the end condition for the deviation prevention control is met, at S454, the traveling control unit 34 sets the steering flag and the brake flag to OFF, and ends the steering control and the brake control. Furthermore, the traveling control unit 34 sets the prevention end flag to ON, sets the deviation flag to OFF, and ends the deviation prevention control.

When the determination at S416 is Yes and the prevention method determined at S408 is the prevention method 4, at S460, the traveling control unit 34 sets the brake flag to ON, as shown in FIG. 4. The traveling control unit 34 sets the brake amount so that the deceleration set in correspondence to the prevention method 4 is achieved, and performs the brake control.

When the determination at S462 is Yes and the vehicle is stopped, at S464, the traveling control unit 34 sets the brake flag to OFF and ends the brake control. Furthermore, the traveling control unit 34 sets the prevention end flag to ON, sets the deviation flag to OFF, and ends the deviation prevention control.

When the determination at S416 is No and the prevention method determined at S408 is the prevention method 5, the traveling assistance apparatus 20 ends the present process without performing the deviation prevention control.

[1-3. Effects]

According to the first embodiment, described above, the following effects can be achieved.

(1) Whether to perform the prevention method 1, 2, 3, or 4 as the prevention method for the deviation prevention control can be appropriately determined, based on the recognition result of the travel road 200 on which the vehicle 100 is traveling and the traveling state of the vehicle 100. In the prevention methods 1 and 4, either of the steering control and the brake control is performed. In the prevention method 2, both of the steering control and the brake control are performed. In the prevention method 3, a period over which either of the steering control and the brake control is performed and a period over which both of the steering control and the brake control are performed are set.

For example, as a result of only the steering control being performed first as the deviation prevention control, as in the prevention method 3, lateral acceleration of a magnitude required for deviation prevention can be more readily generated, compared to when the steering control and the brake control are simultaneously performed and the magnitude of the lateral acceleration is limited.

(2) The relationship between the deviation speed, the deviation angle, the lateral acceleration required for deviation prevention, and the prevention method is indicated by a map. Therefore, the prevention method can be easily determined from the map, based on the deviation speed, the deviation angle, and the lateral acceleration required for deviation prevention.

According to the first embodiment, described above, S400 corresponds to a process serving as a travel road recognizing unit. S402 corresponds to a process serving as a road-surface state acquiring unit. S404 corresponds to a process serving as a traveling state acquiring unit. S406 corresponds to a process serving as a deviation determining unit. S408 to S416 correspond to a process serving as a method determining unit. S420, S430, and S440 correspond to a process serving as a path setting unit. S422 to S428, S432 to S438, S442 to S454, and S460 to S464 correspond to a process serving as a traveling control unit.

2. Second Embodiment

[2-1. Differences with the First Embodiment]

According to the first embodiment, the prevention method is determined from the map shown in FIG. 8, based on the deviation speed and the deviation angle. In this regard, the second embodiment differs from the first embodiment in that the prevention method is determined based on the extent by which the vehicle deviates from the travel road when the brake control is performed on the vehicle at differing decelerations during the deviation prevention control. A maximum deviation amount and a deviation area indicating the extent of deviation from the travel road will be described hereafter.

Aside from the difference with the first embodiment regarding the method for determining the prevention method, the configuration of the traveling assistance system according to the second embodiment is identical to the configuration of the traveling assistance system 2 according to the first embodiment. Therefore, constituent sections that are identical are given the same reference numbers. Thus, the preceding descriptions shall be referenced regarding sections with the same reference numbers.

[2-2. Processes]

Figure 9:
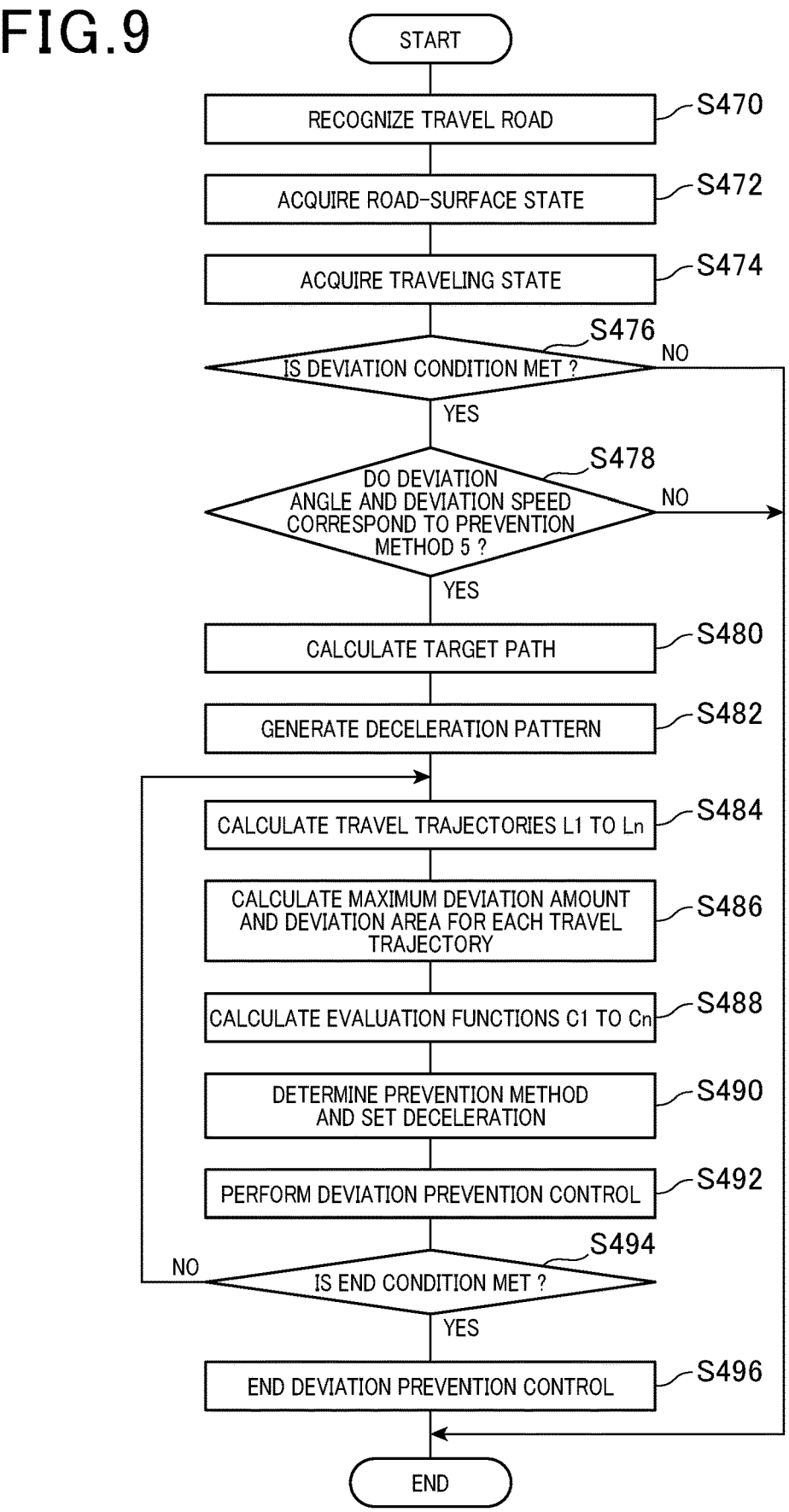
FIG. 9 is a flowchart of a deviation prevention process according to a second embodiment.

A deviation prevention process in FIG. 9 is performed at a predetermined time interval. S470 to S476 in FIG. 9 are essentially the same processes as those at S400 to S406 in FIG. 2 according to the first embodiment. Therefore, descriptions thereof are omitted.

When the determination at S478 is Yes, and the deviation angle and the deviation speed meet the condition for determining the prevention method to be the prevention method 5 according to the first embodiment, the traveling control unit 34 ends the present process. In this case, the deviation prevention control is not performed.

When the determination at S478 is No, and the deviation angle and the deviation speed do not meet the condition for determining the prevention method to be the prevention method 5, at S480, the path setting unit 32 sets the target path for preventing deviation from the travel road in a manner similar to that at S420, S430, and S440 in FIG. 3 according to the first embodiment.

At S482, the method determining unit 30 sets a pattern for changing the deceleration of the vehicle at an interval of 0.2 G, from 0 G to 0.8 G, for example, to calculate travel trajectories when the deceleration of the vehicle is changed during the deviation prevention control. The pattern for changing the deceleration may be varied based on the friction coefficient of the travel road acquired at S472. For example, the maximum value of the deceleration decreases and the interval for changing the deceleration becomes smaller as the friction coefficient decreases.

At S484, the method determining unit 30 calculates the travel trajectory of the vehicle for each deceleration set at S482. Specifically, the method determining unit 30 calculates the steering amount through feedback of the vehicle position outputted from a travel model shown in FIG. 10, such as to track the target path set at S480. In the travel model of the vehicle, the position of the vehicle is calculated with the calculated steering amount and the decelerations set at S482 as input.

The method determining unit 30 calculates the travel trajectory that is the change in vehicle position corresponding to each deceleration set at S482, for each deceleration, by calculating the vehicle position over a predetermined period.

Figure 11:
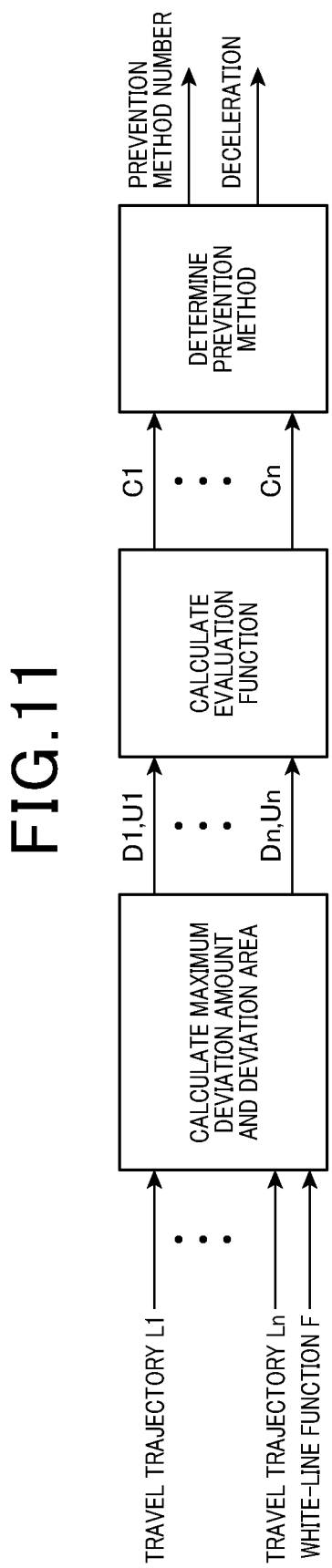
FIG. 11 is a block diagram of calculation of appropriate prevention method and deceleration from evaluation function values.

At S486, the method determining unit 30 calculates the maximum deviation amount and the deviation area as the extent of deviation from the white line 202 on the deviation side, for each of an n-number of travel trajectories L1 to Ln calculated by changing the deceleration based on the pattern set at S482, as shown in FIG. 11.

Figure 12:
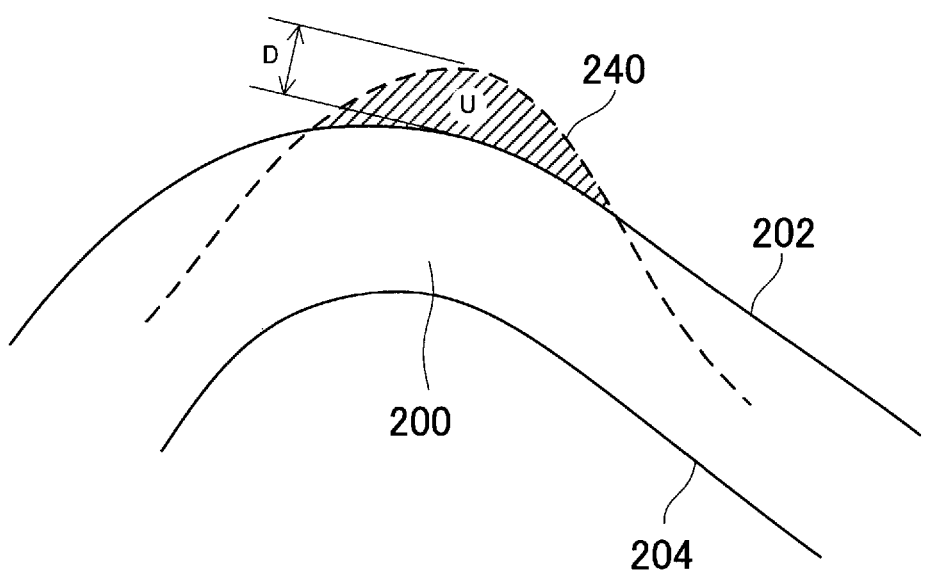
FIG. 12 is an explanatory diagram of a maximum deviation amount and a deviation area.

As shown in FIG. 12, the maximum deviation amounts D1 to Dn are distances by which the vehicle deviates the most from the white line 202 on the deviation side, for the travel trajectories L1 to Ln, respectively. The deviation areas U1 to Un are areas demarcated by the white line 202 and a travel trajectory 240 on the outer side of the white line 202 on the deviation side.

At S488, the method determining unit 30 calculates function values by substituting the maximum deviation amounts D1 to Dn and the deviation areas U1 to Un respectively corresponding to the travel trajectories L1 to Ln into an evaluation function C, shown in an expression (2), below. In the expression (2), a is a value set in advance within a range of $0 \leq a \leq 1$.

$$C = a \times D + (1-a) \times U \quad (2)$$

Figure 10:
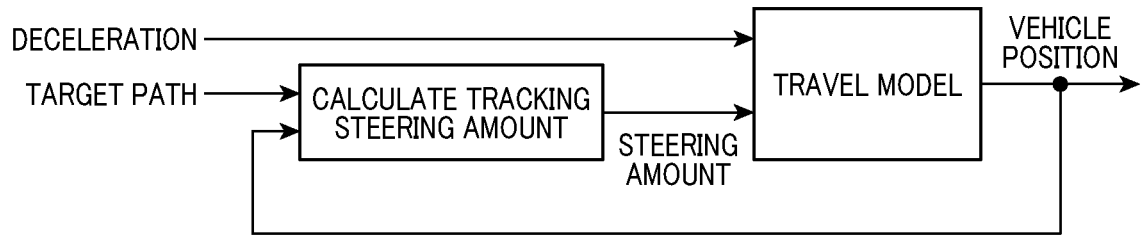
FIG. 10 is a block diagram of calculation of a vehicle position during deviation prevention.

At S490, the method determining unit 30 sets the brake amount for the brake control in the deviation prevention control, such that the deceleration corresponding to the smallest function value among the function values of the evaluation functions C1 to Cn calculated for the travel trajectories L1 to Ln is achieved. As the steering amount for the steering control, a tracking steering amount calculated for tracking the target path in FIG. 10 is used. The prevention method is determined based on the deceleration corresponding to the smallest function value.

When the travel trajectories calculated within the predetermined period at S484 do not return onto the travel road at any of the decelerations set at S482, at S490, the method determining unit 30 determines the prevention method to be the prevention method 4 according to the first embodiment.

When a travel trajectory calculated within the predetermined period at S484 returns onto the travel road and 0 G is selected as the deceleration corresponding to the smallest function value, at S490, the method determining unit 30 determines the prevention method to be the prevention method 1 according to the first embodiment.

When a travel trajectory calculated within the predetermined period at S484 returns onto the travel road and a deceleration that is greater than 0 G is selected as the deceleration corresponding to the smallest function value, at S490, the method determining unit 30 determines the prevention method to be the prevention method 2 according to the first embodiment.

At S492, the traveling control unit 34 performs the deviation prevention control based on the prevention method determined at S490, based on the steering amount calculated for calculating the travel trajectory and the brake amount set such that the selected deceleration is achieved.

At S494, the traveling control unit 34 determines whether or not any of the conditions (1) to (4), described regarding S426 in FIG. 3 according to the first embodiment as the end conditions for the deviation prevention control, is met, when the brake control is not performed as the deviation prevention control.

In addition, at S494, the traveling control unit 34 determines whether or not any of the conditions (1) to (5), described regarding S436 as the end conditions for the deviation prevention control, is met, when the brake control is performed as the deviation prevention control. Here, regarding the determination at S494, S434 shall be read as S492 in the description regarding the condition (5) for S436 in FIG. 3 according to the first embodiment.

When the determination at S494 is No and the end condition for the deviation prevention control is not met, the process returns to S484. As a result of the process returning to S484 from S494, the deceleration at which the function value of the evaluation function becomes the smallest and the prevention method determined based on the deceleration are updated as needed during the deviation prevention control.

For example, when the prevention method is determined to be the prevention method 2 during the deviation prevention control after being determined to be the prevention method 1, the deviation prevention control corresponding to the prevention method 3 according to the first embodiment is performed. In addition, as a result of the process returning to S484 from S494, whether a method in which either of the steering control and the brake control is performed, or a method in which both of the steering control and the brake control are performed, is performed as the prevention method is updated as needed during the deviation prevention control.

When the determination at S494 is Yes and the end condition for the deviation prevention control is met, at S496, the traveling control unit 34 ends the deviation prevention control.

[2-3. Effects]

According to the second embodiment, the following effects can be achieved in addition to the effect (1) according to the first embodiment.

(1) The function value of the evaluation function is determined based on the maximum deviation amount and the deviation area for each travel trajectory of the vehicle for each deceleration in the deviation prevention control calculated by the deceleration being changed. As a result, the prevention method can be determined with high accuracy.

(2) Whether a method in which either the steering control and the brake control is performed, or a method in which both of the steering control and the brake control are performed, is performed as the prevention method is updated as needed during the deviation prevention control. Therefore, the appropriate prevention method can be determined over the elapse of time.

According to the second embodiment, described above, S470 corresponds to a process serving as the travel road recognizing unit. S472 corresponds to a process serving as the road-surface state acquiring unit. S474 corresponds to a process serving as the traveling state acquiring unit. S476 corresponds to a process serving as the deviation determining unit. S478 and S492 to S496 correspond to a process serving as the traveling control unit. S480 corresponds to a process serving as the path setting unit. S482 to S490 correspond to a process serving as the method determining unit.

3. Third Embodiment

Figure 13:
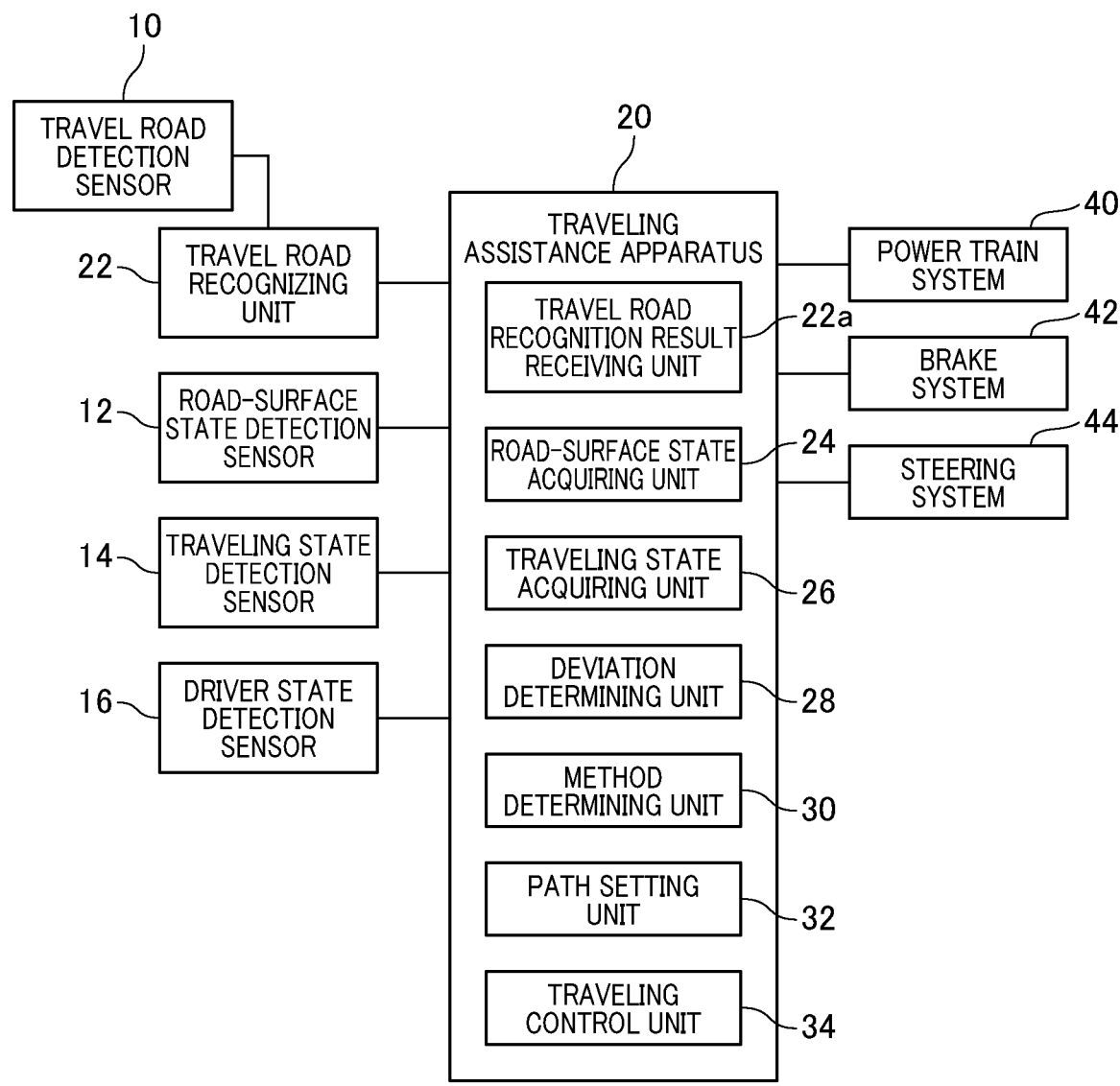
FIG. 13 is a block diagram of a traveling assistance apparatus according to a third embodiment.
Figure 14:
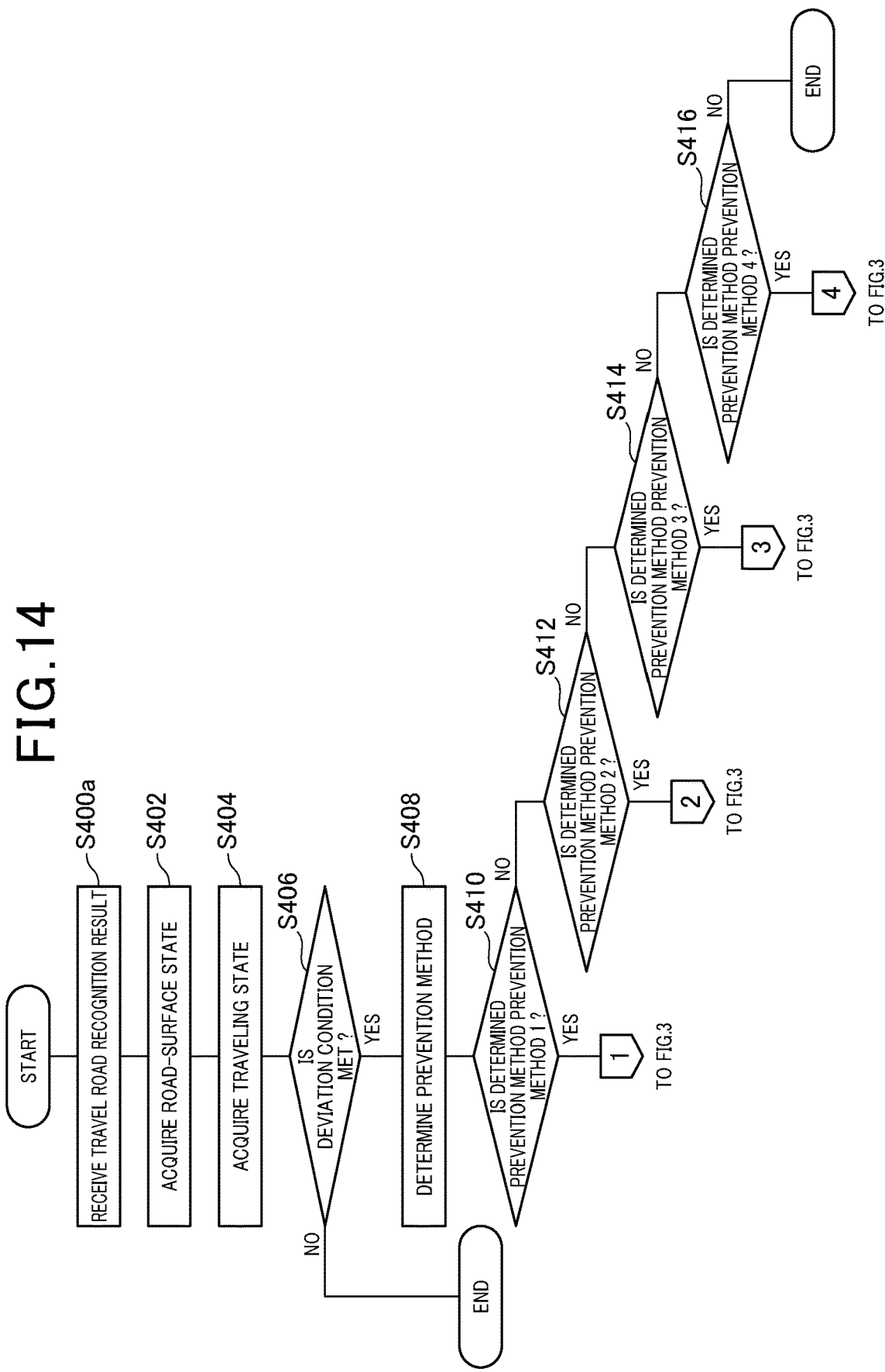
FIG. 14 is a flowchart of a first deviation prevention process according to the third embodiment.
Figure 15:
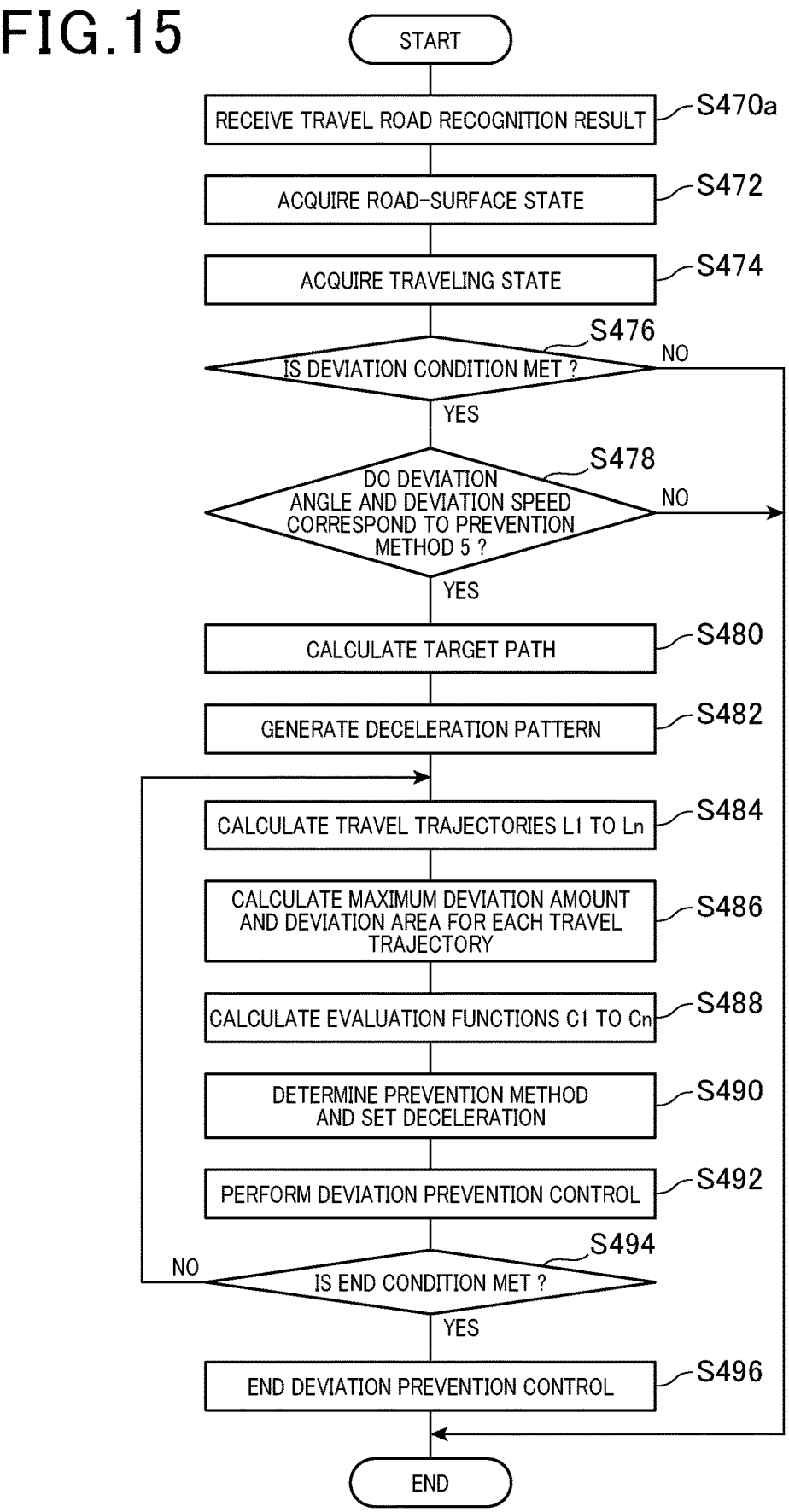
FIG. 15 is a flowchart of a second deviation prevention process according to the third embodiment.

Next, a traveling assistance system according to a third embodiment will be described with reference to FIGS. 13 to 15.

In the traveling assistance system according to the first embodiment, the travel road recognizing unit 22 is provided within the traveling assistance apparatus 20. In this regard, in the traveling assistance system according to the present embodiment, the travel road recognizing unit 22 is provided independently from the traveling assistance apparatus 20, as shown in FIG. 13. Instead, a travel road recognition result receiving unit 22a is provided within the traveling assistance apparatus 20. Other configurations of the traveling assistance system according to the present embodiment are identical to those of the traveling assistance system 2 according to the first embodiment. The same constituent sections are given the same reference numbers. Descriptions thereof are omitted.

The travel road recognizing unit 22 is connected between the travel road detection sensor 10 and the traveling assistance apparatus 20. For example, the travel road recognizing unit 22 is configured such that a single microcomputer or a plurality of microcomputers are mounted therein. The microcomputer includes a CPU, a RAM, a ROM, and a semiconductor memory, such as a flash memory. The functions of the travel road recognizing unit 22 are implemented by the CPU running programs stored in the ROM or a non-transitory, tangible recording medium, such as a flash memory. The means for actualizing the functions of the travel road recognizing unit 22 is not limited to software. Some or all of the functions may be actualized through use of hardware combining logic circuits, analog circuits, and the like. The travel road recognizing unit 22 may be configured such as to be provided integrally within the travel road detection sensor 10.

The travel road recognizing unit 22 acquires coordinates of a boundary of a travel road on which the vehicle is traveling, the vehicle being a point of origin of the coordinate axes. The travel road recognizing unit 22 acquires the coordinates from the travel road detection sensor 10 as the detection result of the travel road. The boundary of the travel road may be a white line that demarcates the travel road. The boundary may also be a boundary between a paved road and an unpaved shoulder of the road.

For example, the travel road recognizing unit 22 determines a function for approximating the white line from the coordinates of the white line, and calculates a curvature from the function for approximating the white line as the shape of the travel road. In addition, the travel road recognizing unit 22 recognizes the position of the white line in relation to the vehicle, based on the function for approximating the white line. The travel road recognizing unit 22 outputs the curvature of the travel road and the position of the white line in relation to the vehicle to the traveling assistance apparatus 20 as the recognition result of the travel road. For example, a cubic function is used as the function for approximating the white line.

The travel road recognition result receiving unit 22a is provided in the traveling assistance apparatus 20, together with the road-surface state acquiring unit 24, the traveling state acquiring unit 26, the deviation determining unit 28, the method determining unit 30, the path setting unit 32, and the traveling control unit 34. The travel road recognition result receiving unit 22a receives the recognition result of the travel road from the travel road recognizing unit 22. The functions of the travel road recognition result receiving unit 22a are actualized by a program being run by the CPU configuring the traveling assistance apparatus 20.

Next, a first deviation prevention process performed by the traveling assistance apparatus 20 according to the present embodiment will be described with reference to the flowchart in FIG. 14. The deviation prevention process shown in FIG. 14 is the deviation prevention process shown in FIG. 2 according to the first embodiment that has been changed in part. S402 to S416 in FIG. 14 are essentially the same processes as those at S402 to S416 in FIG. 2 according to the first embodiment. Therefore, descriptions thereof are omitted.

First, at S400a, the travel road recognition result receiving unit 22a receives the recognition result of the travel road from the travel road recognizing unit 22. The recognition result of the travel road includes the curvature of the travel road and the position of the white line in relation to the vehicle calculated and recognized by the travel road recognizing unit 22.

Next, at S402 and S404, processes similar to those according to the first embodiment are performed. The road-surface state acquiring unit 24 acquires the road-surface state (friction coefficient) of the travel road. The traveling state acquiring unit 26 acquires the traveling state (such as the vehicle speed, acceleration in the forward, backward, leftward, and rightward directions, and yaw rate) of the vehicle.

Then, at S406, the deviation determining unit 28 determines whether or not the vehicle will deviate from the travel road based on the recognition result of the travel road received by the travel road recognition result receiving unit 22a and the traveling state of the vehicle acquired by the traveling state acquiring unit 26. The deviation determining unit 28 determines whether or not the vehicle will deviate from the travel road based on whether or not conditions similar to those according to the first embodiment are met. When the determination at S406 is No, the present process is ended. When the determination at S406 is Yes, the process proceeds to S408. Processes similar to those according to the first embodiment are subsequently performed.

As a result, the traveling assistance system according to the present embodiment can achieve effects similar to those of the traveling assistance system according to the first embodiment, as well.

Next, a second deviation prevention process performed by the traveling assistance apparatus 20 according to the present embodiment will be described with reference to the flowchart in FIG. 15. The deviation prevention process shown in FIG. 15 is the deviation prevention process shown in FIG. 9 according to the second embodiment that has been changed in part. S472 to S496 in FIG. 15 are essentially the same processes as those at S472 to S496 in FIG. 9 according to the second embodiment. Therefore, descriptions thereof are omitted.

First, at S470a, the travel road recognition result receiving unit 22a receives the recognition result of the travel road from the travel road recognizing unit 22. The recognition result of the travel road includes the curvature of the travel road and the position of the white line in relation to the vehicle calculated and recognized by the travel road recognizing unit 22.

Next, at S472 and S474, processes similar to those according to the first embodiment are performed. The road-surface state acquiring unit 24 acquires the road-surface state (friction coefficient) of the travel road. The traveling state acquiring unit 26 acquires the traveling state (such as the vehicle speed, acceleration in the forward, backward, leftward, and rightward directions, and yaw rate) of the vehicle.

Then, at S476, the deviation determining unit 28 determines whether or not the vehicle will deviate from the travel road based on the recognition result of the travel road received by the travel road recognition result receiving unit 22a and the traveling state of the vehicle acquired by the traveling state acquiring unit 26. The deviation determining unit 28 determines whether or not the vehicle will deviate from the travel road based on whether or not conditions similar to those according to the second embodiment are met. When the determination at S476 is No, the present process is ended. When the determination at S476 is Yes, the process proceeds to S478. Processes similar to those according to the second embodiment are subsequently performed.

As a result, the traveling assistance system according to the present embodiment can achieve effects similar to those of the traveling assistance system according to the second embodiment, as well.

According to the third embodiment, described above, S400a and S470a correspond to a process serving as a travel road recognition result receiving unit.

4. Other Embodiments (1) According to the above-described first embodiment, any of the prevention methods 1 to 5 for the deviation prevention control is selected. In addition to the prevention methods 1 to 5, a following prevention method may be used. That is, for example, when the deviation speed is equal to or higher than the predetermined speed, first, the brake control is performed to reduce the vehicle speed. Then, midway through the brake control, the steering control is performed in addition to the brake control. In this case, the steering control and the brake control are interchanged in the description regarding S442 to S448 in FIG. 3.

In addition, a prevention method in which both of the steering control and the brake control are first performed, and then, midway through the deviation prevention control, only either of the steering control and the brake control is performed, may be used.

In addition, a prevention method in which either of the steering control and the brake control is first performed, and then, midway of the deviation prevention control, the deviation prevention control is switched to the other of the steering control and the brake control, may be used.

(2) According to the above-described embodiments, an example in which a white line demarcates the travel road is given. However, in addition, in cases in which the travel road is demarcated by a boundary between the road and the shoulder of the road, rather than a white line, the deviation prevention control may be performed with the boundary between the road and the shoulder of the road as the white line described according to the above-described embodiments.

(3) According to the above-described embodiments, in cases in which the friction coefficient of the travel road is difficult to acquire, the lateral acceleration serving to prescribe the border between the prevention methods in the map shown in FIG. 8 according to the first embodiment and the pattern for deceleration set according to the second embodiment may be fixed. Cases in which the friction coefficient of the travel road is difficult to acquire include, for example, cases in which the road-surface state is difficult to detect from the image data from the camera, such as at night, and cases in which the tire is not provided with a strain sensor.

(4) A plurality of functions provided by a single constituent element according to the above-described embodiments may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element. Furthermore, a part of a configuration according to the above-described embodiments may be omitted. Moreover, at least a part of a configuration according to above-described embodiments may be added to or replace a configuration according to another of the above-described embodiments. Any embodiment included in the technical concept specified solely by the wordings of the scope of claims is an embodiment of the present disclosure.

(5) The present disclosure can also be actualized by various modes in addition to the above-described traveling assistance apparatus 20, such as the traveling assistance system 2 of which the traveling assistance apparatus 20 is a constituent element, a traveling assistance program enabling a computer to function as the traveling assistance apparatus 20, a recording medium on which the traveling assistance program is recorded, and a traveling assistance method.

What is claimed is:

1. A traveling assistance apparatus comprising:
    a travel road recognizing unit that recognizes a travel road on which a vehicle is traveling;
    a traveling state acquiring unit that acquires a traveling state of the vehicle;
    a deviation determining unit that determines whether or not the vehicle will deviate from the travel road based on at least a recognition result of the travel road recognized by the travel road recognizing unit, of the recognition result and the traveling state acquired by the traveling state acquiring unit;
    a method determining unit that determines whether to perform, as a prevention method for deviation prevention control to prevent deviation of the vehicle from the travel road in response to the deviation determining unit determining that the vehicle will deviate from the travel road, a method in which either of steering control and brake control of the vehicle is performed, or a method in which a period over which either of the steering control and the brake control is performed and a period over which both of the steering control and the brake control are performed are set, based on the recognition result and the traveling state; and
    a traveling control unit that sets a steering amount for the steering control and a brake amount for the brake control in response to the deviation prevention control being performed based on the prevention method determined by the method determining unit, based on the recognition result and the traveling state.

2. The traveling assistance apparatus according to claim 1, wherein:
    the method determining unit determines whether to perform, as the prevention method for deviation prevention control to prevent deviation of the vehicle from the travel road in response to the deviation determining unit determining that the vehicle will deviate from the travel road, the method in which either of steering control and brake control of the vehicle is performed, a method in which both of the steering control and the brake control are performed, or the method in which a period over which either of the steering control and the brake control is performed and a period over which both of the steering control and the brake control are performed are set, based on the recognition result and the traveling state.

3. The traveling assistance apparatus according to claim 2, further comprising:
    a path setting unit that sets a target path for preventing deviation of the vehicle from the travel road based on the recognition result and the traveling state, wherein
    the traveling control unit sets the steering amount such that the vehicle travels along the target path set by the path setting unit.

4. The traveling assistance apparatus according to claim 3, wherein:
    the traveling control unit determines a start timing for the brake control based on the recognition result and the traveling state, in response to the prevention method being that in which the steering control is first performed and then, midway of the steering control, the brake control is performed in addition to the steering control; and the traveling control unit determines a start timing for the steering control based on the recognition result and the traveling state, in response to the prevention method being that in which the brake control is first performed and then, midway through the brake control, the steering control is performed in addition to the brake control.

5. The traveling assistance apparatus according to claim 4, further comprising:
a road-surface state acquiring unit that acquires a road-surface state of the travel road, wherein
the method determining unit determines the prevention method based on the recognition result, the traveling state, and the road-surface state acquired by the road-surface state acquiring unit.

6. The traveling assistance apparatus according to claim 5, wherein:
the traveling control unit ends the deviation prevention control in response to the vehicle returning to the travel road based on the recognition result.

7. The traveling assistance apparatus according to claim 6, wherein:
the traveling control unit ends the deviation prevention control in response to a lateral acceleration and a yaw rate of the vehicle serving as the traveling state respectively becoming equal to or less than predetermined values.

8. The traveling assistance apparatus according to claim 7, wherein:
the traveling control unit continues the deviation prevention control until the vehicle stops and ends the deviation prevention control in response to the vehicle stopping in response to the brake control being performed as the deviation prevention control, in response to a driver not gripping a steering wheel.

9. The traveling assistance apparatus according to claim 8, wherein:
the traveling control unit continues the deviation prevention control until the vehicle stops and ends the deviation prevention control in response to the vehicle stopping in response to the brake control being performed as the deviation prevention control, in response to a driver not being alert and being in a state incapable of driving.

10. The traveling assistance apparatus according to claim 1, further comprising:
a path setting unit that sets a target path for preventing deviation of the vehicle from the travel road based on the recognition result and the traveling state, wherein
the traveling control unit sets the steering amount such that the vehicle travels along the target path set by the path setting unit.

11. The traveling assistance apparatus according to claim 1, wherein:
the traveling control unit determines a start timing for the brake control based on the recognition result and the traveling state, in response to the prevention method being that in which the steering control is first performed and then, midway of the steering control, the brake control is performed in addition to the steering control; and
the traveling control unit determines a start timing for the steering control based on the recognition result and the traveling state, in response to the prevention method being that in which the brake control is first performed and then, midway through the brake control, the steering control is performed in addition to the brake control.

12. The traveling assistance apparatus according to claim 1, further comprising:
a road-surface state acquiring unit that acquires a road-surface state of the travel road, wherein
the method determining unit determines the prevention method based on the recognition result, the traveling state, and the road-surface state acquired by the road-surface state acquiring unit.

13. The traveling assistance apparatus according to claim 1, wherein:
the traveling control unit ends the deviation prevention control in response to the vehicle returning to the travel road based on the recognition result.

14. The traveling assistance apparatus according to claim 1, wherein:
the traveling control unit ends the deviation prevention control in response to a lateral acceleration and a yaw rate of the vehicle serving as the traveling state respectively becoming equal to or less than predetermined values.

15. The traveling assistance apparatus according to claim 1, wherein:
the traveling control unit continues the deviation prevention control until the vehicle stops and ends the deviation prevention control in response to the vehicle stopping in response to the brake control being performed as the deviation prevention control, in response to a driver not gripping a steering wheel.

16. The traveling assistance apparatus according to claim 1, wherein:
the traveling control unit continues the deviation prevention control until the vehicle stops and ends the deviation prevention control in response to the vehicle stopping in response to the brake control being performed as the deviation prevention control, in response to a driver not being alert and being in a state incapable of driving.

17. A traveling assistance apparatus comprising:
a travel road recognition result receiving unit that receives a recognition result of a travel road on which a vehicle is traveling;
a traveling state acquiring unit that acquires a traveling state of the vehicle;
a deviation determining unit that determines whether or not the vehicle will deviate from the travel road based on at least the recognition result of the travel road received by the travel road recognition result receiving unit, of the recognition result and the traveling state acquired by the traveling state acquiring unit;
a method determining unit that determines whether to perform, as a prevention method for deviation prevention control to prevent deviation of the vehicle from the travel road in response to the deviation determining unit determining that the vehicle will deviate from the travel road, a method in which either of steering control and brake control of the vehicle is performed, or a method in which a period over which either of the steering control and the brake control is performed and a period over which both of the steering control and the brake control are performed are set, based on the recognition result and the traveling state; and
a traveling control unit that sets a steering amount for the steering control and a brake amount for the brake control in response to the deviation prevention control being performed based on the prevention method determined by the method determining unit, based on the recognition result and the traveling state.

18. The traveling assistance apparatus according to claim 17, wherein:

the method determining unit determines whether to perform, as the prevention method for deviation prevention control to prevent deviation of the vehicle from the travel road in response to the deviation determining unit determining that the vehicle will deviate from the travel road, the method in which either of steering control and brake control of the vehicle is performed, a method in which both of the steering control and the brake control are performed, or the method in which a period over which either of the steering control and the brake control is performed and a period over which both of the steering control and the brake control are performed are set, based on the recognition result and the traveling state.

19. A traveling assistance method for suppressing deviation from a travel road, the traveling assistance method comprising:

a step of recognizing a travel road on which a vehicle is traveling;

a step of acquiring a traveling state of the vehicle;

a step of determining whether or not the vehicle will deviate from the travel road based on at least a recognition result of the travel road, of the recognition result and the traveling state;

a step of determining whether to perform, as a prevention method for deviation prevention control to prevent deviation of the vehicle from the travel road in response to the vehicle being determined to deviate from the travel road, a method in which either of steering control and brake control of the vehicle is performed, or a method in which a period over which either of the steering control and the brake control is performed and a period over which both of the steering control and the brake control are performed are set, based on the recognition result and the traveling state; and a step of setting a steering amount for the steering control and a brake amount for the brake control in response to the deviation prevention control being performed based on the prevention method that has been determined.

\* \* \* \* \*